United States Patent [19]

Udell et al.

[11] Patent Number: 4,713,207

[45] Date of Patent: Dec. 15, 1987

[54] MANUFACTURING METHOD FOR THERMOPLASTIC CONTAINER WITH INTEGRAL LIFTING RING

[75] Inventors: Theodore H. Udell, West Chester, Pa.; David R. Koller, Wilmington, Del.

[73] Assignee: Container Corporation of America, Alton, Ill.

[21] Appl. No.: 883,752

[22] Filed: Jul. 7, 1986

[51] Int. Cl.<sup>4</sup> ...... B29C 49/04; B29C 47/02; B29C 43/00
[52] U.S. Cl. .................... 264/515; 264/516; 264/531; 264/534
[58] Field of Search ............. 264/515, 516, 523, 525, 264/532, 534, 539, 531; 425/149, 503, 525; 65/48; 220/69, 72, 74

[56] References Cited

U.S. PATENT DOCUMENTS

| 2,269,010 | 1/1942 | Cunningham | 65/48 |
| 4,378,328 | 3/1983 | Przytulla et al. | 264/534 |
| 4,659,531 | 4/1987 | Ezaki | 264/515 |

Primary Examiner—Jan H. Silbaugh
Assistant Examiner—Neil Michael McCarthy
Attorney, Agent, or Firm—Richard W. Carpenter

[57] ABSTRACT

A plastic container with an integral handling ring is formed in a mold having a pair of side sections movable toward each other and a pair of co-planar end sections movable toward each other and toward said side sections, by placing molten extrudate in a mold between the side and end sections, so that a handling ring can be formed and compression joined to the container at the same time the container is being formed by blow-molding.

3 Claims, 7 Drawing Figures

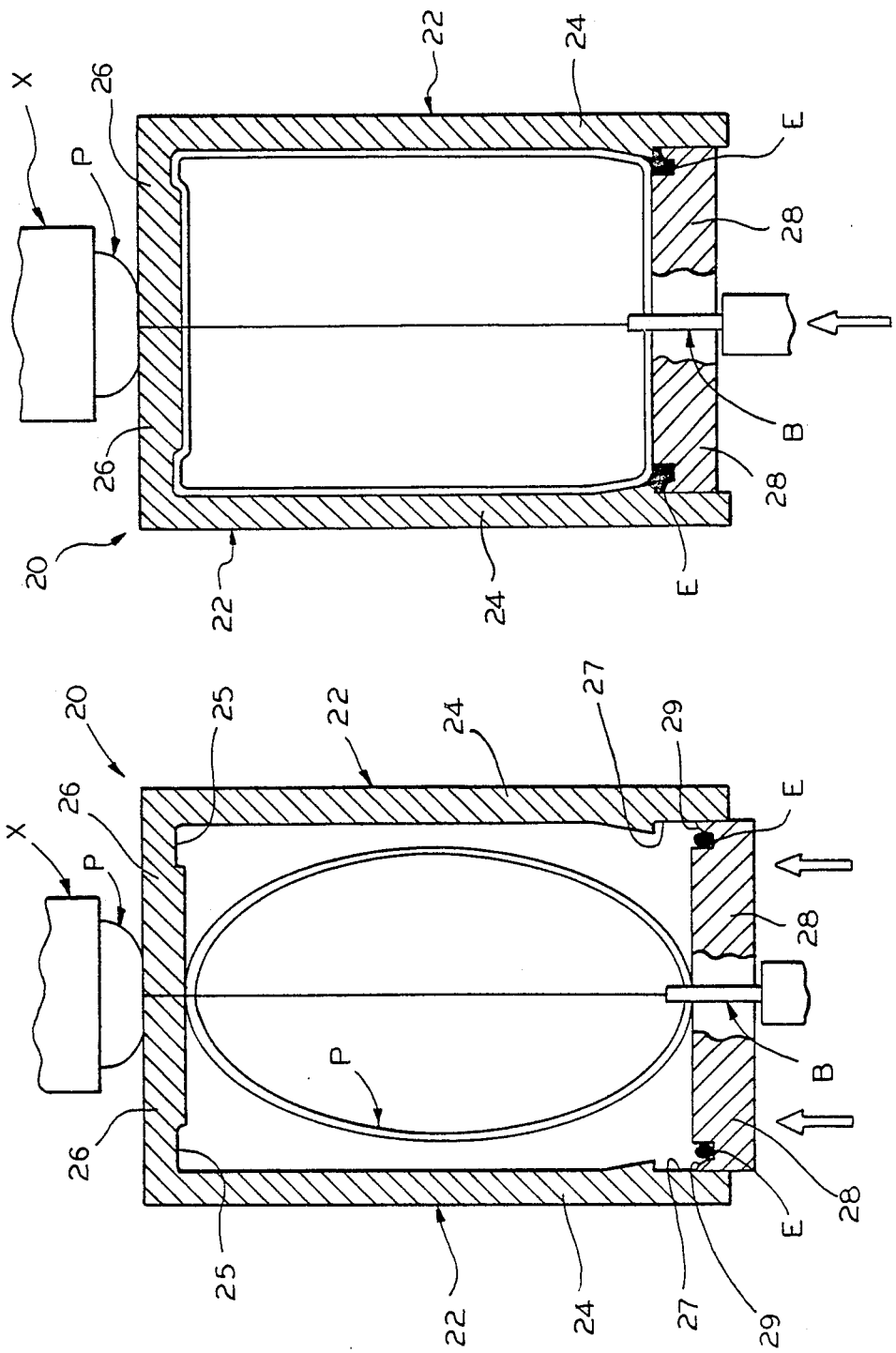

MANUFACTURING METHOD FOR THERMOPLASTIC CONTAINER WITH INTEGRAL LIFTING RING

BACKGROUND OF THE INVENTION

Field of the Invention

The present invention is directed to a container and to a method for manufacturing from thermoplastic material a hollow container having an integral lifting handle.

In fabricating large hollow bodies, such as, for example, 55 gallon drums, from thermoplastic materials, it is common practice to blow-mold such bodies from an extruded, hollow, tubular shaped preform or parison. The parison is placed within an open blow-mold apparatus, the apparatus is closed and air blown into the parison to force it to expand outward against walls of the mold apparatus. Generally, it is desirable to provide lifting handles or roller chimes about the formed body for ease of handling. The lifting handles may comprise rings encircling the body which also serve as roller chimes.

Various method have been utilized to attach lifting surfaces or handles to thermoplastic blow-molded hollow bodies. For large bodies such as drums, it is known to place prefabricated roller hoops into a blow-mold so that the hoops are welded to the drum when the parison is inflated. Such construction has resulted in separation of the hoops from the drums during handling. In order to avoid such separation problems, some processes employ channels formed in the mold cavity into which a portion of the thermoplastic material of the parison is forced. The channels are defined by moveable components of the mold. After the plastic material has been forced into the channel, the moveable components compress the material into a desired shape of a chime or handle. The latter method is disclosed, for example, in U.S. Pat. Nos. 4,228,911 and 4,529,570. It is believed that a disadvantage of this type of construction is a weakened area at the point at which the chime joins the drum. Although it has been proposed to increase the volume of material and therefore the wall thickness in the area of the protrusion, such extra material also has a tendency to undesirably increase wall thickness over a broad area. Accordingly, the thickness and location of rings are limited in this type process. Furthermore, in order to minimize stress cracks, these compression molded rings are formed of very low melt index materials (approximately 2 HLMI) resulting in processing difficulties requiring non-conventional extrusion equipment.

An example of a process for welding or bonding roller chimes to a plastic drum is set forth in U.S. Pat. No. 3,960,474. In that patent, the pre-formed chimes or hoops are placed in a blow-mold and a parison inflated such that the soft thermoplastic material of the parison adheres to the preformed chimes. The bond between the chimes and drum thus depends on the ability of the plastic material to adhere to the chime material, and such bonds have been known to separate under stress, such as by lifting of a filled drum by the chime.

SUMMARY OF THE INVENTION

It is an object of the present invention to overcome the above mentioned disadvantages of the prior art processes of forming a drum with a chime or lifting handle. In the present invention, a drum is formed by blow-molding of a parison in a mold of a desired configuration. Within the mold there is provided an area defined by moveable components which, in their final closed position, will create a shape corresponding to a desired configuration of a roller chime or handle. A suitable thermoplastic material is placed into the defined area prior to blow-molding the drum. As the drum is molded, the moveable components compress the thermoplastic material causing it to attain the desired shape. Since the defined area is open to the mold cavity, in one form of the invention a portion of the compressed material is forced into the cavity and into contact with the expanded and pressurized parison. The pressure existing at the point of contact is sufficient to cause the compressed material to infuse into the material of the expanded parison to create an integral joining of the formed chime to the molded drum.

BRIEF DESCRIPTION OF THE DRAWINGS

FIG. 3 is a view similar to FIG. 2, but illustrating the mold in a closed position after the start but prior to the completion of the blowing step in the molding process;

FIG. 4 is a view similar to FIG. 3, but illustrating the position of the mold and container after the container has been completely formed;

It will be understood that, for purposes of clarity, certain elements may have been intentionally omitted from certain views where they are believed to be illustrated to better advantage in other views.

DESCRIPTION OF THE PREFERRED EMBODIMENT

Figure 7:
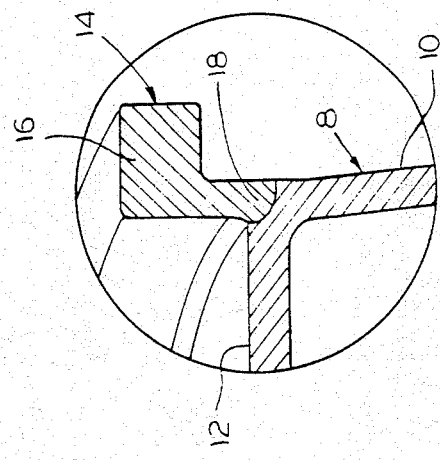
FIG. 7 is an enlarged fragmentary sectional view of an integral joint formed by the process of the present invention.
Figure 6:
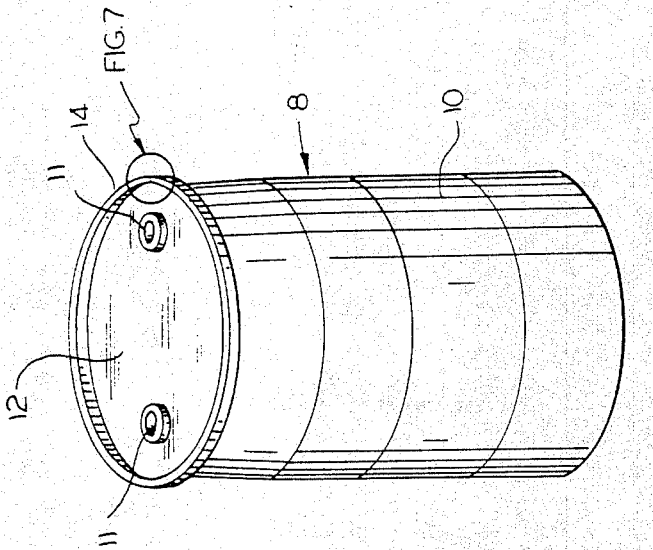
FIG. 6 is a perspective view of a container formed by the process of the present invention.

Referring now to the drawings, and particularly to FIGS. 6 and 7, it will be seen that a drum, indicated generally at 8, is shown as having a generally cylindrical side wall 10 and top and bottom end walls 12 and 12a, respectively, (only top end wall 12 being shown in FIG. 6). Top end wall 12 may be provided with one or more dispensing or venting openings 11.

Container 8 has at its upper corner an integral solid handling ring, indicated generally at 14, which includes a main section 16 with a narrow flange section 18 joined to the body of drum 8. The ring 14 is sometimes referred to as a roller chime. Ring 14 may be used either for lifting the drum or for supporting the drum for rolling. Although the ring 14 is shown at a top surface of drum 8, it will be appreciated that ring 14 could be placed at other positions and that multiple rings could be employed.

Referring to FIG. 7, there is shown a partial cross-sectional view of a joint between ring 14 and drum 8 formed by the practice of the present invention. The ring 14 and flange section 18 are compression molded into the shape illustrated. During the compression molding process, the section 18 extrudes from the closing portion of the mold, as will be described with respect to FIGS. 1–5, and infuses into the thermoplastic material of the drum 8. By selecting the material of both the ring 14 and drum 8 from a common family of thermoplastics, the resulting joint will be essentially a molecular bond or joint, i.e., the joint will be indistinguishable from the surrounding material and will have the strength of the material. In one form, for example, the ring 14 and drum 8 may be formed from the same type of thermoplastic material.

While the illustrated embodiment indicates an infusion of the extrudate from the ring 14 into the material of the container 8, it will be appreciated that there may be occasions when it is desirable for the material of the container 8 to fuse to the ring 14 without material of one component being forced into material of the other. Furthermore, it is possible to force the material of container 8 to infuse into the ring 14. A more significant advantage of applicant's invention is that by using two separate material components for the container and ring, the ring 14 may be colored by addition of an additive. Coloring of ring 14 may permit identification of containers by ring color which could advantageously be used for quick identification of contents of a container, if such color coding scheme is used.

Since the extrudate from which the ring 14 is formed is separately provided, the ring 14 may be made as thick as is necessary for heavy lading. Additionally, the ring 14 may be placed in any position on the container 8. Having the ring 14 on top provides protection for the vent openings 11. For a better understanding of the forming method of the present invention, reference is now made to FIGS. 1–5 which illustrated a blow-molding apparatus 20 of a conventional type, except for portions of the structure described hereinafter which are used for an insert compression molding type operation in addition to the blow molding operation.

Mold apparatus 20 includes a pair of side sections 22, which are movable toward and away from each other, and a pair of end sections 28, which are movable toward and away from related mold side sections 22. Each of the side sections 22 includes a generally semi-cylindrical side wall 24 and an integral generally semi-circular end wall 26. It will be noted that the end walls 26 are at the top of the drawing, but they actually form the bottom of the container, because the container is formed in an upside down position.

Side section end walls 26 are provided with aligned annular recesses 25 which form an annular boss or flange 17 at the bottom of the container 8. Each of the side section side walls 24 presents at the opposite end thereof, or lower end as shown in the drawings, an annular recess 27 which cooperates with annular recesses 29 in end sections 28 to form a common annular groove, the purpose of which is described hereinafter. End sections 28 of the mold apparatus are generally semi-circular in shape and correspond to and are aligned with end walls 26 of side sections 22.

Each of the end sections 28, as previously mentioned, presents at its outer periphery an axially inward facing recess 29 which cooperates with related recess 27 in the side wall 24 of side section 22 to provide a common annular groove the purpose of which is to receive material necessary to provide the container handling ring 14 in a manner hereinafter described. It will be understood that the shape and dimensions of the recesses 27 and 29 may be varied as desired.

Positioned above the mold is a conventional extruding apparatus, indicated generally at X, from which is extruded a generally cylindrical tube or parison P of plastic material. Positioned at the lower end of the molding apparatus is a blowing mechanism including a blow pipe indicated generally at B. The details of the extruder and the blow pipe mechanism are not shown in detail since their structures may be of the type found in conventional blow molding equipment.

Figure 1:
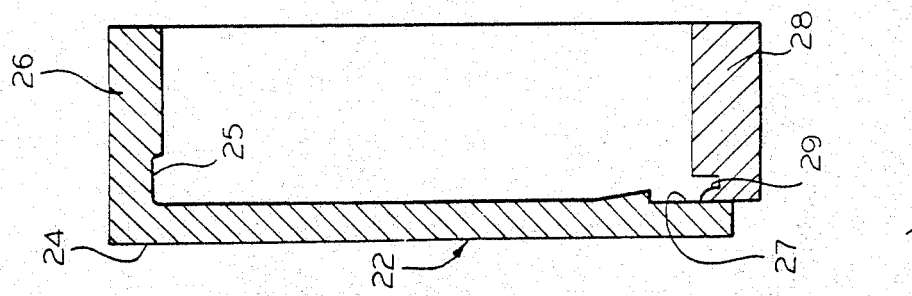
FIG. 1 is a schematic side elevational view, partly in vertical cross-section, of molding apparatus utilized in the practice of the present invention to form the container illustrated in FIG. 6.
Figure 2:
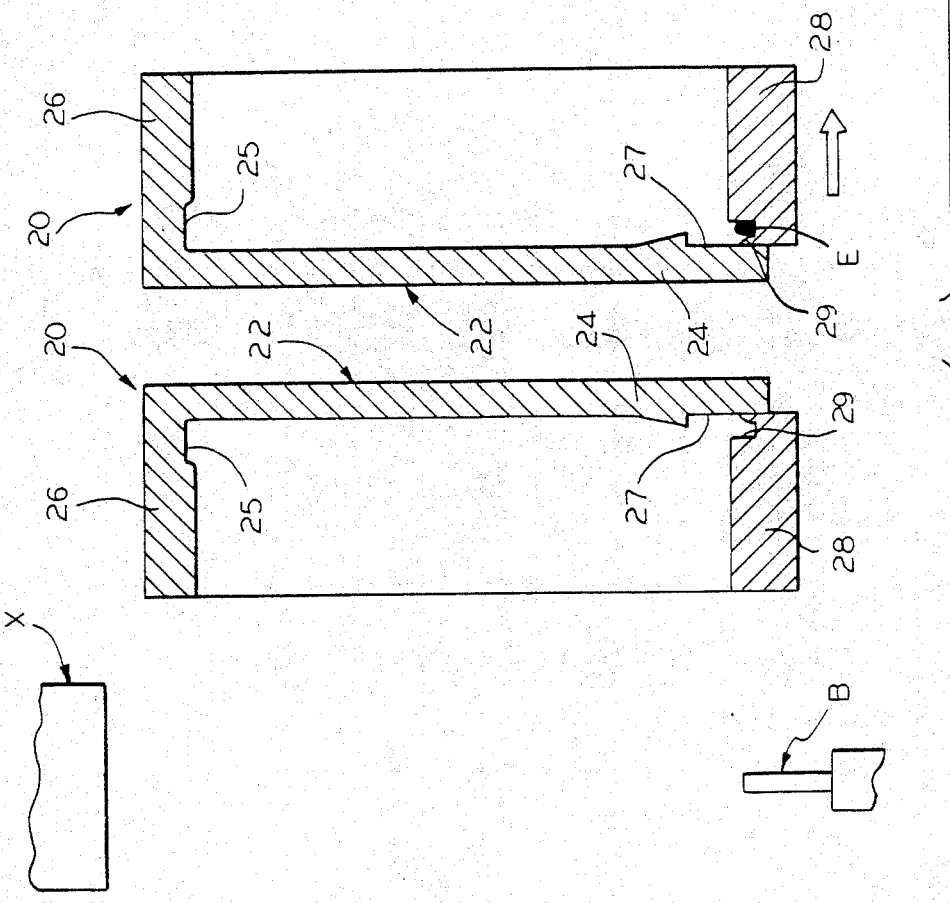
FIG. 2 is a view similar to FIG. 1, but illustrating the introduction of a soft tube of plastic material (parison) into the space between sections of the open mold and also the insertion of the molten extrudate into the mold.

In the practice of the present invention, the mold apparatus 20 is first placed in the open position shown in FIGS. 1–2. A molten plastic extrudate, indicated generally at E, is inserted into the related recesses 27 and 29 of the mold 20.

At approximately the time the extrudate E has been placed in the mold, the parison P is extruded from the extruder X, as shown in FIG. 2, with the lower end of the parison being disposed to extend over the blow pipe B. The side sections 22 are then moved toward each other to pinch off the ends of the parison. Air under pressure is introduced into the center of the parison through the blow pipe B to start formation of the container body by a conventional blow molding process, as illustrated in FIG. 3.

As the container body is being formed, the end sections 28 of the mold are moved toward each other and toward the related side sections 22, so that the molten plastic extrudate E is compressed between the end sections 28 and the side sections 22 of the mold to form handling ring 14, as shown in FIG. 4, while air is continued to be introduced to complete formation of the container body.

Figure 5:
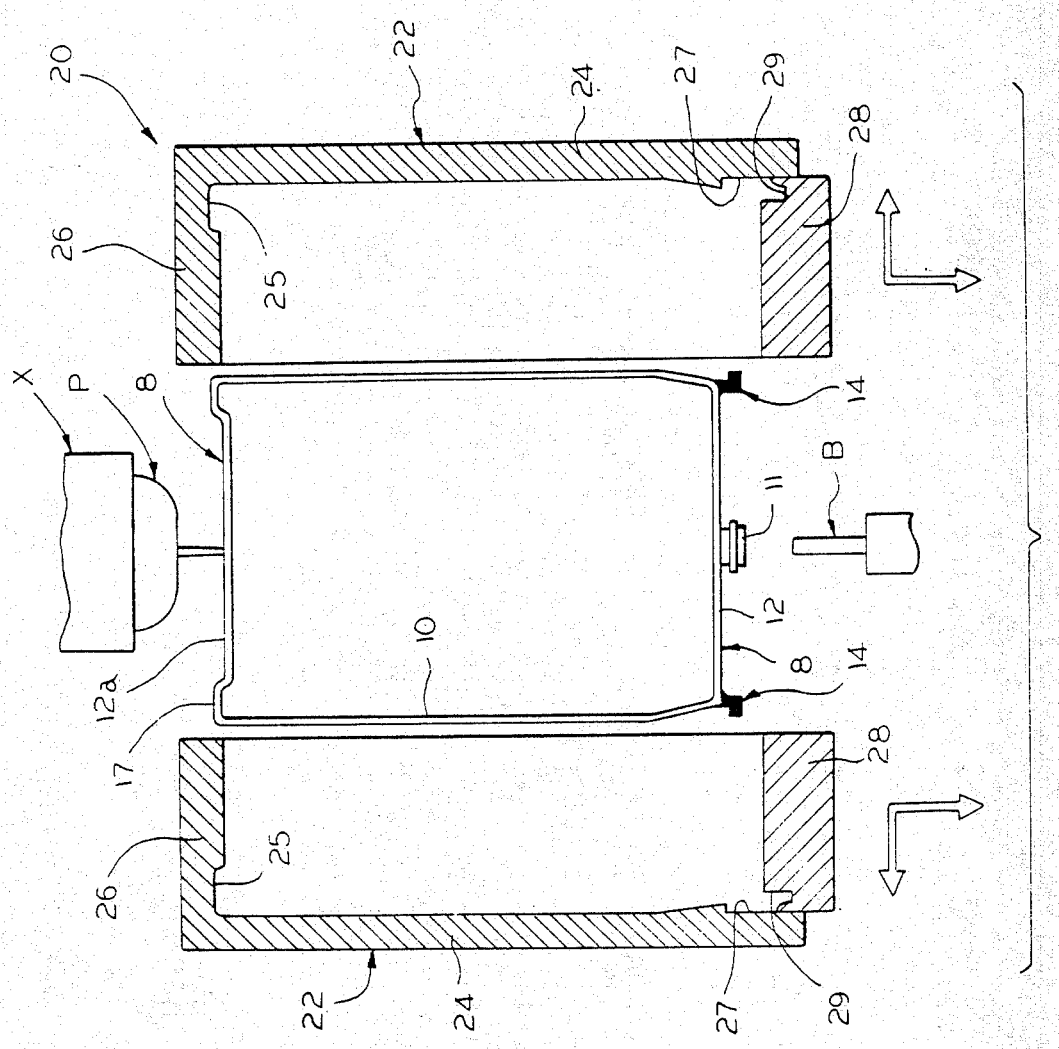
FIG. 5 is a view similar to FIG. 4, but with the mold sections shown in an open position after formation of the container.

Thus, it will be understood that, at the same time the container body is being formed by a blow molding process, the handling ring 14 is not only being formed by the compression molding process, but also ring 14 is being joined to the adjacent portion of the body of drum 8. Ring 14 therefore becomes an integral portion of drum 8. Thus, it will be seen that the present invention contemplates a novel method for forming a hollow body container which represents an improvement over and eliminates many of the disadvantages of the prior processes in forming a hollow container with an attached drum handling ring. The final stage of the operation is the opening of the mold sections to remove a completed container as best seen in FIG. 5.

Although, the container described above is provided with only one ring which is located at the upper corner of the container body, it should be understood that, if desired, the same process can be employed to form a pair of rings, with one ring at each end of the container. Also, if desired the process may be used to join a ring to a container body at a location other than at a corner. In addition, while the ring 14 has been shown as continuous, it will be appreciated that for some applications it may be desirable to provide a discontinuous handle arrangement. By limiting the extent of recesses 27 and 29 in a circumferential direction, the drum 8 may be formed with spaced handles for lifting. Furthermore, while the method of the present invention has been disclosed in conjunction with an illustrative shaped lifting surface or roller chime, other shapes of chimes or lifting surfaces may be achieved by variation of the configuration, position and size of the components defining the recesses 27 and 29.

What is claimed is:

1. A method of forming, in a mold having a pair of side sections movable toward and away from each other and a pair of generally co-planar end sections movable toward and away from each other and toward and away from said side sections, a plastic container having a generally cylindrical, hollow body with an integral, solid ring extending radially outward therefrom said method comprising the steps of:
    (a) while said mold is in an open position, inserting molten plastic extrudate between said mold end and side sections in grooves formed by adjacent recesses of respective mold sections;
    (b) extruding a plastic parison between said mold sections;
    (c) closing said mold by moving said side sections toward each other and said end sections toward said side sections to close off the opposite ends of said parison and to compress extrudate between said mold end and side sections to form said ring;
    (d) introducing air under pressure into the interior of the parison in said mold to force the material of said parison against said mold sections to form said hollow container body and, at the same time, weld said ring to said body.

2. A method of forming, in a mold having a pair of side sections movable toward and away from each other and a pair of generally co-planar end sections movable toward and away from each other and toward and away from said side sections, a plastic container having a hollow tubular body with a solid, integral, peripheral flange extending normal thereto and outwardly therefrom, said method comprising steps of:
    (a) while said mold is in an open position, inserting molten plastic extrudate between said mold end and side sections in grooves formed by adjacent recesses of respective mold sections;
    (b) extruding a plastic parison between said mold sections;
    (c) closing said mold by moving said side sections toward each other and said end sections toward said side sections to close off the opposite ends of said parison and to compress extrudate between said mold end and side sections to form said flange;
    (d) introducing air under pressure into the interior of the parison in said mold to force the material of said parison against said mold sections to form said hollow container body and, at the same time, weld said flange to said body.

3. A method of forming, in a mold having a pair of side sections movable toward and away from each other and a pair of generally co-planar end sections movable toward and away from each other and toward and away from said side sections, a plastic container having a hollow body with an integral, solid flange extending outwardly therefrom, said method comprising the steps of:
    (a) while said mold is in an open position, inserting molten plastic extrudate between said mold end and side sections in grooves formed by adjacent recesses of respective mold sections;
    (b) extruding a plastic parison between said mold sections;
    (c) closing said mold by moving said side sections toward each other and said end sections toward said side sections to close off the opposite ends of said parison and to compress extrudate between said mold end and side sections to form said flange;
    (d) introducing air under pressure into the interior of the parison in said mold to force the material of said parison against said mold sections to form said hollow container body and, at the same time, weld said flange to said body.

* * * * *